United States Patent [19]

Thomas

[11] 4,197,673
[45] Apr. 15, 1980

[54] PLANT, SHRUB AND TREE PROTECTOR GARDEN PANEL

[76] Inventor: David V. Thomas, 2211 Reeves Cr., Ottawa, Ontario K1H 7H3, Canada

[21] Appl. No.: 963,925

[22] Filed: Nov. 24, 1978

[51] Int. Cl.² ............................................ A01G 13/02
[52] U.S. Cl. ...................................... 47/26; 47/28 R
[58] Field of Search .................... 47/20, 21, 26 R, 27, 47/28 R, 29, 31; 248/220.3, 220.4, 221.1, 221.2

[56] References Cited

U.S. PATENT DOCUMENTS

| 650,024 | 5/1900 | Riggins | 47/28 |
| 3,173,386 | 3/1965 | Magers | 248/220.3 X |
| 3,483,995 | 12/1969 | Larson | 248/220.4 X |
| 3,846,935 | 11/1974 | Wagner | 47/26 |

FOREIGN PATENT DOCUMENTS

| 27484 | of 1930 | Australia | 47/28 |
| 424313 | 10/1924 | Fed. Rep. of Germany | 47/28 |
| 856065 | 5/1940 | France | 47/26 |
| 1280820 | 7/1972 | United Kingdom | 47/29 |

*Primary Examiner*—Edgar S. Burr
*Assistant Examiner*—Steven A. Bratlie
*Attorney, Agent, or Firm*—Daniel Jay Tick

[57] ABSTRACT

Each of a plurality of rectangular sheet-like plates of rigid material has a plurality of square holes formed therethrough in rows and columns. Each of a plurality of anchoring strips of rigid material is of elongated narrow rectangular configuration with a point formed at one narrow end thereof for penetrating the ground. Each of the anchoring strips has a plurality of square holes formed therethrough in rows and columns. A plurality of selectively openable and closable rings have a diameter sufficient to accommodate two of the plates and passable through the holes thereof. Each of a plurality of bolts has a head with an extending square cross-sectioned shank portion fittable in the holes of the plates and strips whereby the plates are securable to each other via the bolts and wing nuts in any desired structural combination. The anchoring strips are securable to the plates via the bolts and wing nuts in any desired manner to secure the plates to the ground and the rings are extendible through selected holes of selected ones of the plates to form desired structural combinations of the plates.

1 Claim, 4 Drawing Figures

PLANT, SHRUB AND TREE PROTECTOR GARDEN PANEL

BACKGROUND OF THE INVENTION

The present invention relates to a plant, shrub and tree protector garden panel. More particularly, the invention relates to a plant, shrub and tree protector garden panel for protecting plants, shrubs and trees from snow and ice.

The principal object of the invention is to provide a device for protecting plants, shrubs and trees from snow and ice.

An object of the invention is to provide a garden panel of simple structure which is assembled and used with facility, convenience and rapidity.

Another object of the invention is to provide a plant, shrub and tree protector and garden panel of simple structure, having few and simple parts, formable and combinable with facility and convenience into any desired structural combination of the component parts thereof.

Still another object of the invention is to provide a device of simple structure, which is inexpensive in manufacture and functions efficiently, effectively and reliably to provide a strong and durable shelter for protecting plants, shrubs, trees, and the like, from snow and ice, without collapsing under the weight of such snow and ice.

Yet another object of the invention is to provide a device having few and simple parts, formable and combinable with facility and rapidity into any desired structural combination of the component parts thereof, and functionable as a playpen, compost container, miniature greenhouse, cover for outside power units, and the like.

BRIEF SUMMARY OF THE INVENTION

In accordance with the invention, a plant, shrub and tree protector garden panel for protecting plants, shrubs and trees from snow and ice comprises a plurality of rectangular sheet-like plates of substantially rigid material each having a plurality of square holes formed therethrough in rows and columns. Each of a plurality of anchoring strips of substantially rigid material is of substantially elongated narrow rectangular configuration with a point formed at one narrow end thereof for penetrating the ground. Each of the anchoring strips has a plurality of squares holes formed therethrough in rows and columns. A plurality of selectively openable and closable rings have a diameter sufficient to accommodate two of the plates and are passable through the holes thereof. A plurality of bolts and corresponding wing nuts are provided. Each of the bolts has a head with an extending square cross-sectioned shank portion fittable in the holes of the plates and strips whereby the plates are securable to each other via the bolts and wing nuts in any desired structural combination, the anchoring strips are securable to the plates via the bolts and wing nuts in any desired manner to secure the plates in the ground, and the rings are extendible through selected holes of selected ones of the plates to form desired structural combinations of the plates.

BRIEF DESCRIPTION OF THE DRAWINGS

In order that the invention may be readily carried into effect, it will now be described with reference to the accompanying drawings, wherein.

DETAILED DESCRIPTION OF THE INVENTION

The plant, shrub and tree protector of the invention protects plants, shrubs, trees, and the like, from snow and ice, thereby preventing damage to such plants, shrubs, trees, and the like, due to the weight of such snow and ice.

The plant, shrub and tree protector of the invention comprises a plurality of rectangular sheet-like plates 1, 2, 3, 4 (FIGS. 1 and 2), 5, 6, 7, 8, 9, 10, 11 and 12 (FIG. 4) of substantially rigid material such as, for example, plastic, aluminum, or the like, which material is light in weight, but sturdy and durable. Each of the plates 1 to 12 has a plurality of square holes formed therethrough in rows and columns, as shown in FIG. 2.

Figure 4:
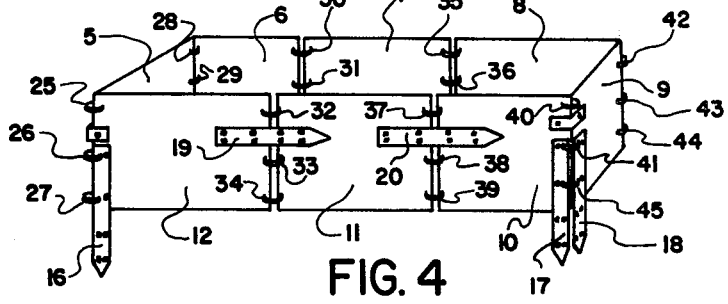
FIG. 4 is a perspective view of another embodiment of a structural combination of components of the plant, shrub and tree protector of the invention.

A plurality of anchoring strips 13, 14, 15 (FIGS. 1 and 2), 16, 17, 18, 19, 20, and so on (FIG. 4), are of substantially rigid material of the same type as that of the plates 1 to 12. Each of the anchoring strips 13 to 20, and so on, is of substantially elongated narrow rectangular configuration with a point formed at one narrow end thereof for penetrating the ground. Each of the anchoring strips 13 to 20, and so on, has a plurality of square holes formed therethrough in rows and columns, as shown in FIGS. 2 and 4.

A plurlity of selectively openable and closable rings 21, 22, 23, 24 (FIG. 2), 25, 26, 27, 28, 29, 30, 31, 32, 33, 34, 35, 36, 37, 38, 39, 40, 41, 42, 43, 44, 45, and so on (FIG. 4), have a diameter sufficient to accommodate two of the plates 1 to 12. The rings 21 to 45, and so on, are passable through the holes of the plates 1 to 12 and the anchoring strips 13 to 20, and so on.

Figure 3:
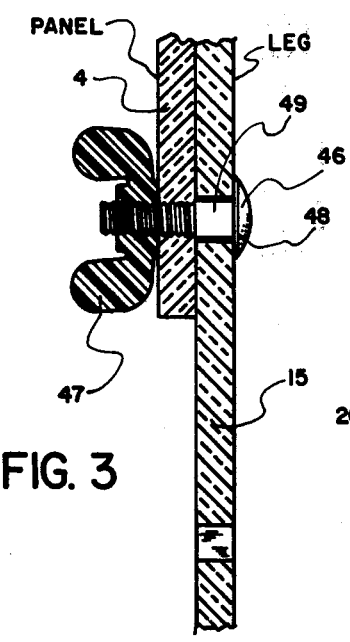
FIG. 3 is a cross-sectional view, on an enlarged scale, illustrating the connection of a pair of component parts of the plant, shrub and tree protector of the invention to each other.

In accordance with the invention, a plurality of bolts, of which a single bolt 46, shown in FIG. 3, and corresponding wing nuts, of which a wing nut 47 is shown in FIG. 3, are provided. Each of the bolts 46 has a head 48 with an extending square cross-sectioned shank portion 49 fittable in the holes of the plates 1 to 12 and the anchoring strips 13 to 20, and so on, as shown in FIG. 3. The plates 1 to 12 are thereby securable to each other via the bolts and wing nuts in any desired structural combination, the anchoring strips 13 to 20, and so on, are securable to the plates 1 to 12 via the bolts and wing nuts in any desired manner to secure the plates in the ground, and the rings 21 to 45, and so on, are extendible through selected holes of selected ones of the plates to form desired structural combinations of the plates.

Figure 1:
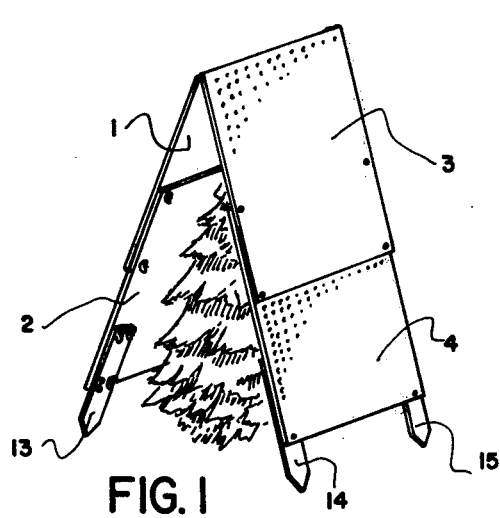
FIG. 1 is a perspective view of an embodiment of a structural combination formed of the components of the plant, shrub and tree protector of the invention, in use.
Figure 2:
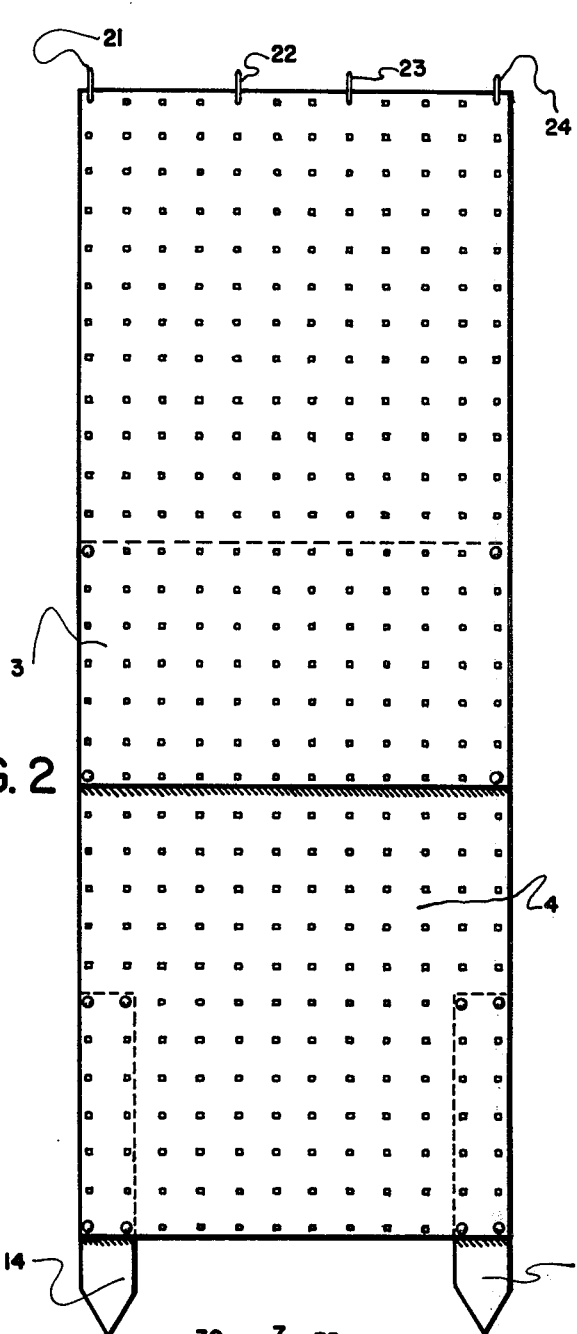
FIG. 2 is a side view, on an enlarged scale, of one side of the structure of FIG. 1.

Thus, in order to protect a shrub, tree, or the like, the plates 1 and 2 may be affixed to each other via bolts and nuts, to form an elongated side, and the plates 3 and 4 may be affixed to each other via nuts and bolts to form a second elongated side, as shown in FIG. 1. The sides may thus be hingedly affixed to each other via the rings 21 to 24, as shown in FIG. 2. Anchoring strip 13 and another anchoring strip not shown in the views of FIGS. 1 and 2, may then be affixed to the plate 2 via nuts and bolts and anchoring strips 14 and 15 may be affixed to the plate 4 via nuts and bolts, as shown in FIGS. 1 and 2. The anchoring strips penetrate into the ground and function to support the sides of the structure of FIGS. 1 and 2 securely in the ground so that said structure forms a dihedral configuration over the shrub, tree, or the like, being protected.

In the embodiment of FIG. 4, the plates 5 to 12 are secured to each other via a plurality of rings to form the sides of a variable rectangular parallelepiped. Anchoring strips may be utilized to secure the plates firmly to each other, as illustrated by the anchoring strips 19 and 20 in FIG. 4, which secure the plates 11 and 12 and 11 and 10 relatively rigidly to each other. Additional anchoring strips are secured to some of the plates via nuts and bolts to provide ground anchoring support for the sides of the structure around shrubs, or the like, desired to be protected.

While the invention has been described by means of specific examples and in specific embodiments, I do not wish to be limited thereto, for obvious modifications will occur to those skilled in the art without departing from the spirit and scope of the invention.

I claim:

1. A plant, shrub and tree protector for protecting plants, shrubs and trees from snow and ice, said plant, shrub and tree protector comprising a plurality of rectangular sheet-like plates of substantially rigid material each having a plurality of square holes formed therethrough in rows and columns;

a plurality of anchoring strips of substantially rigid material each being of substantially elongated narrow rectangular configuration with a point formed at one narrow end thereof for penetrating the ground and each having a plurality of square holes formed therethrough in rows and columns;

a plurality of selectively openable and closable rings having a diameter sufficient to accommodate two of said plates and passable through the holes thereof; and a plurality of bolts and corresponding wing nuts, each of the bolts having a head with an extending square cross-sectioned shank portion fittable in the holes of the plates and strips whereby said plates are securable to each other via said bolts and wing nuts in any desired structural combination, said anchoring strips are securable to said plates via said bolts and wing nuts in any desired manner to secure said plates in the ground, and said rings are extendible through selected holes of selected ones of said plates to form desired structural combinations of said plates.

* * * * *